United States Patent
Harwood et al.

(10) Patent No.: US 8,782,948 B2
(45) Date of Patent: Jul. 22, 2014

(54) METHOD AND APPARATUS FOR AEROPONIC FARMING

(75) Inventors: Edward D. Harwood, Ithaca, NY (US); Travis Martin, Chicago, IL (US)

(73) Assignee: Just Greens, LLC, Ithaca, NY (US)

(*) Notice: Subject to any disclaimer, the term of this patent is extended or adjusted under 35 U.S.C. 154(b) by 1011 days.

(21) Appl. No.: 12/189,712

(22) Filed: Aug. 11, 2008

(65) Prior Publication Data
US 2008/0295400 A1 Dec. 4, 2008

Related U.S. Application Data

(63) Continuation of application No. 11/224,491, filed on Sep. 12, 2005, now abandoned.

(60) Provisional application No. 60/608,687, filed on Sep. 10, 2004.

(51) Int. Cl.
*A01G 13/02* (2006.01)
*A01G 31/00* (2006.01)

(52) U.S. Cl.
USPC ................................ 47/29.6; 47/29.5

(58) Field of Classification Search
USPC ......... 47/9, 20.1, 22.1, 25.1, 29.5, 29.6, 29.7, 47/31.1, 32
See application file for complete search history.

(56) References Cited

U.S. PATENT DOCUMENTS

| | | | |
|---|---|---|---|
| 3,181,273 A | 5/1965 | West et al. | |
| 3,708,009 A * | 1/1973 | Viol et al. | 160/84.09 |
| 3,874,721 A * | 4/1975 | Tuggle | 296/105 |
| 3,888,041 A | 6/1975 | Seith et al. | |
| 4,035,950 A | 7/1977 | Anselm | |
| 4,047,327 A * | 9/1977 | Tesch | 47/9 |
| 4,244,145 A | 1/1981 | Polacsek | |
| 4,309,844 A | 1/1982 | King et al. | |
| 4,332,105 A | 6/1982 | Nir | |
| 4,505,068 A | 3/1985 | Kaneko | |
| 4,569,150 A | 2/1986 | Carlson et al. | |
| 4,584,791 A | 4/1986 | Wolf | |
| 4,658,878 A * | 4/1987 | Williams | 160/84.09 |
| 4,713,909 A | 12/1987 | Roper et al. | |
| 4,813,176 A | 3/1989 | Takayasu | |
| 4,844,109 A * | 7/1989 | Navarro | 135/129 |
| 4,869,019 A | 9/1989 | Ehrlich | |
| 4,924,623 A | 5/1990 | van Rens | |
| 4,965,962 A * | 10/1990 | Akagi | 47/65 |
| 4,982,526 A * | 1/1991 | Miyachi | 47/56 |
| 5,042,196 A | 8/1991 | Lukawski | |
| 5,077,935 A * | 1/1992 | Stoever et al. | 47/9 |
| 5,226,255 A | 7/1993 | Robertson | |
| 5,317,834 A | 6/1994 | Anderson | |
| 5,417,010 A | 5/1995 | Ecer | |

(Continued)

*Primary Examiner* — David Parsley
(74) *Attorney, Agent, or Firm* — McCarter & English, LLP

(57) ABSTRACT

A system and method of aeroponic farming includes depositing seeds in a flat containing micro-fleece cloth and placing the flat within a growth chamber. The upper side of the flat is subjected to light of the proper frequencies to promote growth in plants. A nutrient solution is sprayed onto the micro-fleece cloth and the developing root mass of the plants, while controlling temperature, humidity, and carbon dioxide within the growth chamber. The plants are harvested resulting from the seeds at a desired stage of growth. The growth chambers can be stacked on each other and/or located side by side to save space within a facility, and to permit sharing the subsystems which control the nutrient solution, temperature, humidity, and carbon dioxide for the growth chambers.

5 Claims, 7 Drawing Sheets

(56) References Cited

U.S. PATENT DOCUMENTS

| | | |
|---|---|---|
| 5,560,415 A * | 10/1996 | Geissler .................. 160/220 |
| 5,724,768 A | 3/1998 | Ammann, Jr. |
| 5,862,628 A | 1/1999 | Takashima |
| 5,918,416 A | 7/1999 | Ammann, Jr. |
| 5,937,575 A | 8/1999 | Zobel et al. |
| 6,006,471 A | 12/1999 | Sun |
| 6,021,602 A | 2/2000 | Orsi |
| 6,061,957 A | 5/2000 | Takashima |
| 6,070,358 A | 6/2000 | Meikle et al. |
| 6,082,044 A | 7/2000 | Sherfield |
| 6,105,309 A | 8/2000 | Takayanagi |
| 6,219,965 B1 * | 4/2001 | Ishikawa et al. ........... 47/58.1 R |
| 6,237,282 B1 * | 5/2001 | Pitts .................. 47/46 |
| 6,360,482 B1 | 3/2002 | Boyes |
| 6,360,483 B1 | 3/2002 | Sherfield |
| 6,446,386 B1 * | 9/2002 | Holloway .................. 47/56 |
| 6,508,033 B2 | 1/2003 | Hessel et al. |
| 6,578,319 B1 | 6/2003 | Cole et al. |
| 6,615,542 B2 | 9/2003 | Ware |
| 6,729,807 B1 * | 5/2004 | Spittle .................. 405/302.7 |
| 6,807,770 B2 | 10/2004 | Wainwright et al. |
| 6,811,653 B2 * | 11/2004 | Huang .................. 162/158 |
| 7,426,802 B2 | 9/2008 | Umbaugh, Jr. |
| 2003/0121362 A1 * | 7/2003 | Goellner .................. 74/608 |
| 2003/0150160 A1 * | 8/2003 | Anderson .................. 47/73 |
| 2003/0188477 A1 | 10/2003 | Pasternak et al. |
| 2006/0053691 A1 | 3/2006 | Harwood et al. |

* cited by examiner

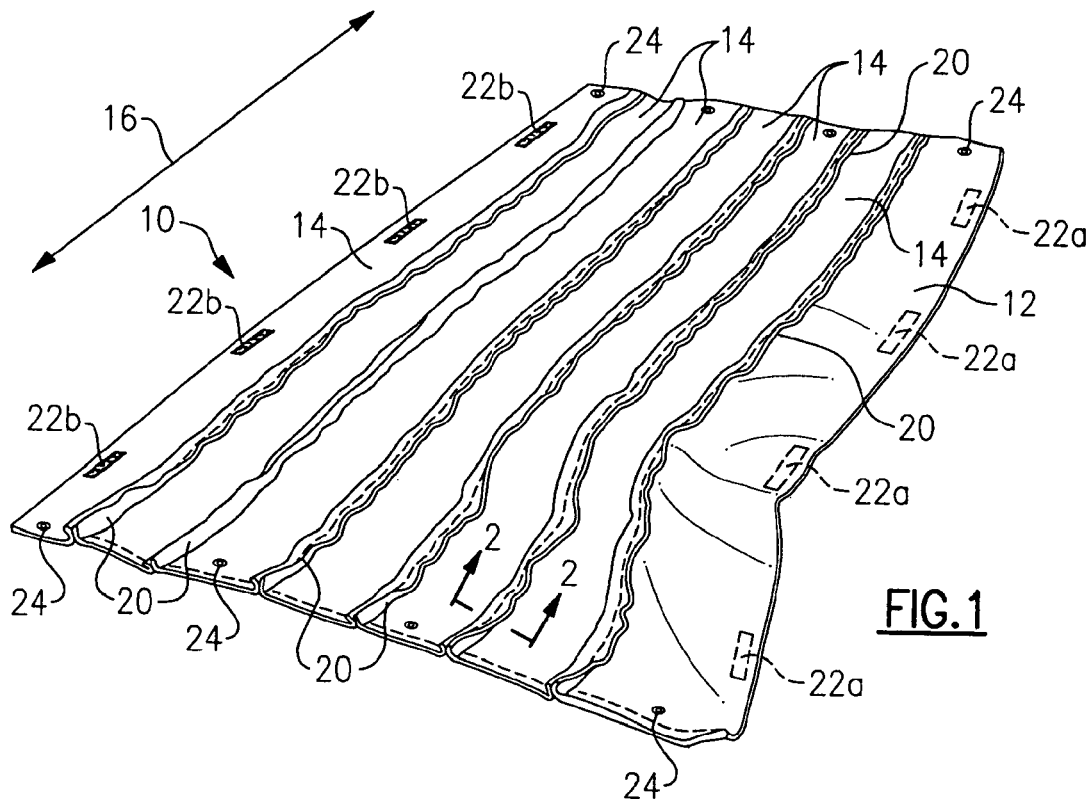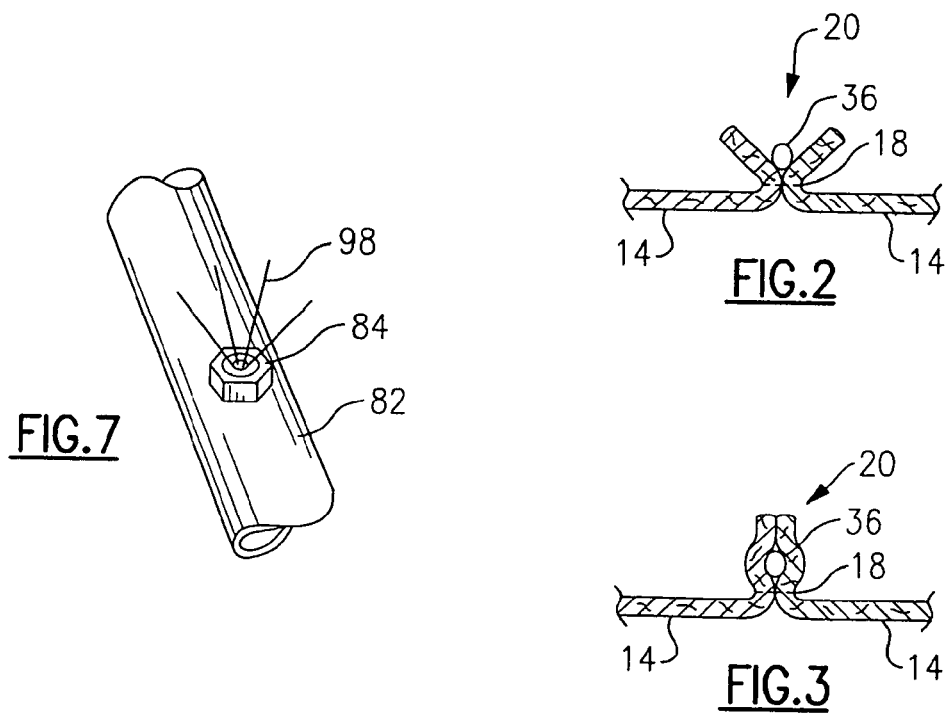

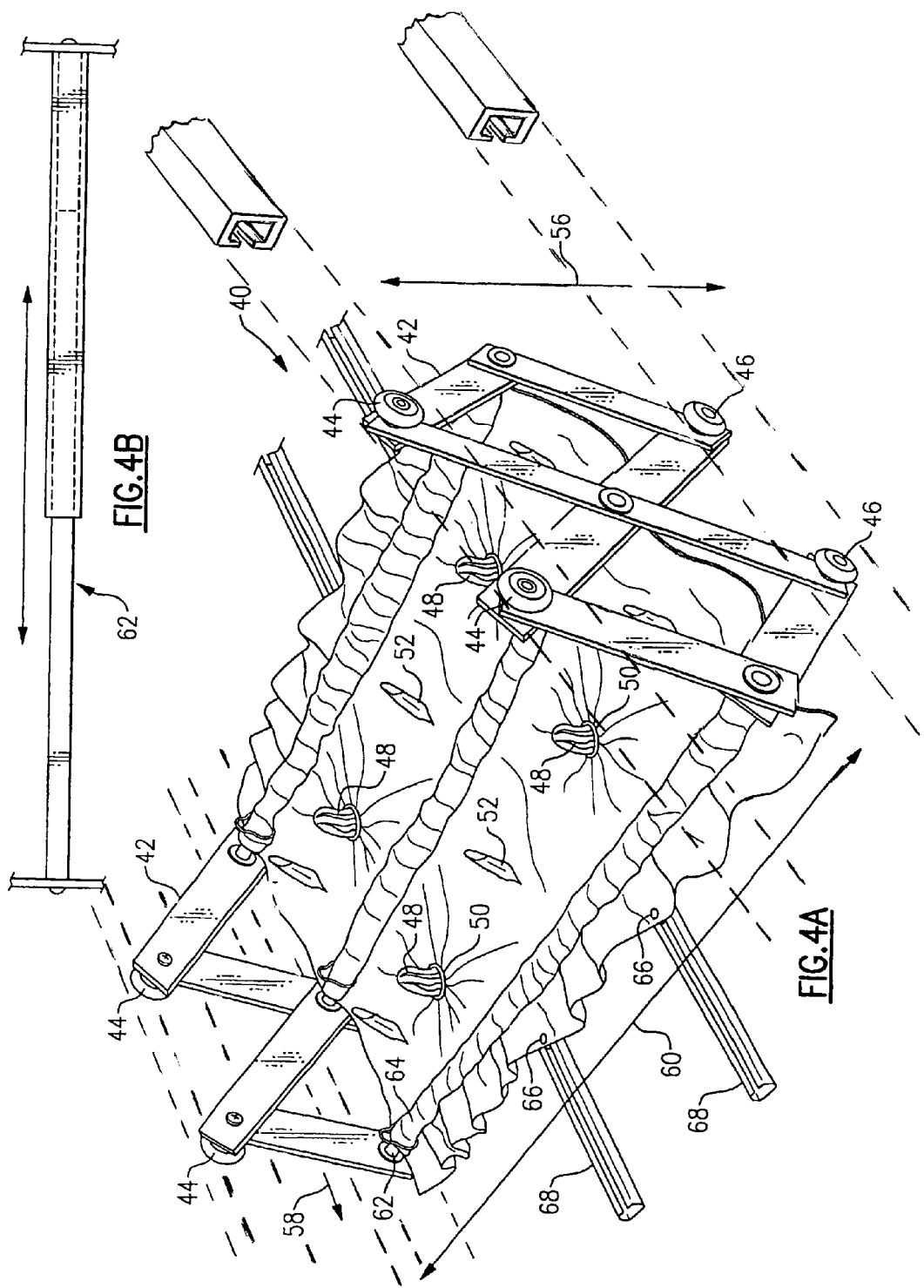

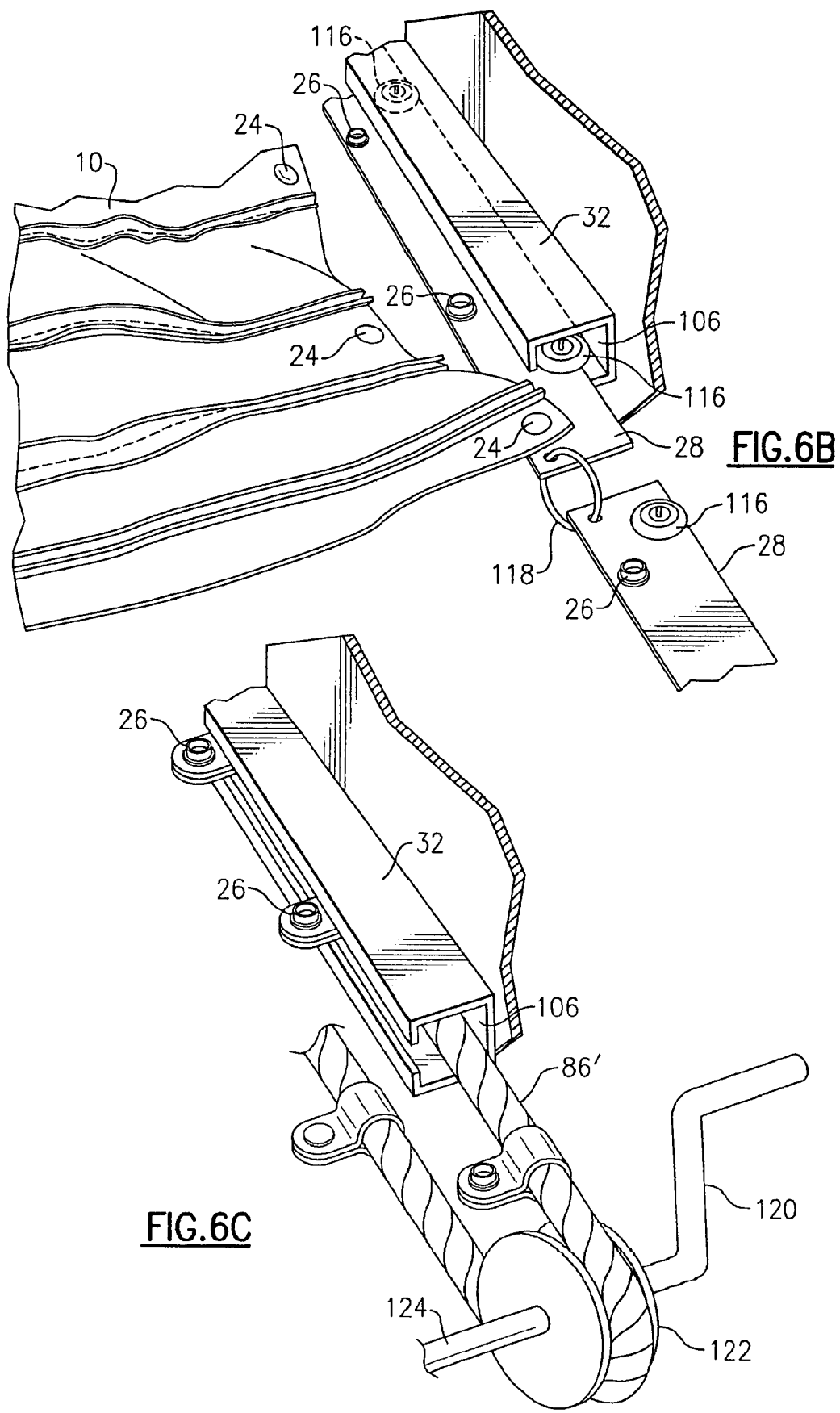

METHOD AND APPARATUS FOR AEROPONIC FARMING

CROSS-REFERENCE TO RELATED APPLICATIONS

This application is a continuation of and claims priority from U.S. patent Ser. No. 11/224,491 filed on Sep. 12, 2005 now abandoned and entitled METHOD AND APPARATUS FOR AEROPONIC FARMING, which in turn claims priority from U.S. Provisional Application Ser. No. 60/608,687 filed on Sep. 10, 2004 and entitled METHOD AND APPARATUS FOR AEROPONIC FARMING, incorporated herein by reference.

FIELD OF THE INVENTION

This invention relates generally to the field of aeroponics, and more particularly to an apparatus which enhances the efficiency of aeroponic farming.

BACKGROUND OF THE INVENTION

Aeroponic growing is distinct from other hydroponic or soil-less plant culture which include ebb and flow, pond, and aggregate growing methods. In the ebb and flow method, the roots are periodically submersed in liquid nutrients; in the pond culture method, the roots are suspended in a solution of liquid nutrients, which solution is generally oxygenated; and in the aggregate growing method, the liquid nutrients are supplied to plants in a non-soil containing aggregate. Because plants require oxygen to their roots, hydroponic methods are designed to allow both oxygen and liquid nutrient to sustain the plants. Aeroponics sprays the liquid containing nutrient solution on the plant roots. These roots are generally bare and suspended in the chamber where the nutrients are sprayed.

"Hydroponics" began in the 1850's, was commercialized in the 1920's, and used by the Army in WWII. It includes using water, sand, and aggregate cultures as the growth medium. Plants fully immersed in water grow less well due to lack of oxygen for their roots. Methods to supplement oxygen to roots include providing an intermittent flow of nutrient solution to supply the plants (NFT, or "Nutrient Film Technology"), aerating the nutrient solution, and spraying of nutrients on roots. The second is similar to the joint Cornell University, NYSEG (New York State Electric & Gas), and NYSERDA (NYS Energy Research and Development Authority) facility where ponds have oxygen injected into the nutrient solution. Some researchers at Cornell have sprayed roots with nutrient solutions. Visits to several facilities identified the drawbacks of NFT and pond systems, such as the large amounts of water required, the need for sophisticated light control and cooling systems, insect problems, and labor for transplanting the individual plants.

Aeroponic systems spray nutrient solution on the roots of plants intermittently and have been used mostly in plant research. There are several styles of aeroponic units growing vegetables at Disney World in Orlando, Fla. However, modifications need to be made to existing systems for cost efficient commercialization.

SUMMARY OF THE INVENTION

Briefly stated, a system and method of aeroponic farming includes depositing seeds in a flat containing micro-fleece cloth and placing the flat within a growth chamber. The upper side of the flat is subjected to light of the proper frequencies to promote growth in plants. A nutrient solution is sprayed onto the micro-fleece cloth and the developing root mass of the plants, while controlling temperature, humidity, and carbon dioxide within the growth chamber. The plants are harvested resulting from the seeds at a desired stage of growth. The growth chambers can be stacked on each other and/or located side by side to save space within a facility, and to permit sharing the subsystems which control the nutrient solution, temperature, humidity, and carbon dioxide for the growth chambers.

According to an embodiment of the invention, an aeroponic system includes a growth chamber; at least one flat effective for receiving seeds in an upper side thereof; light means for providing light effective for photosynthesis in plants; and means for spraying a nutrient solution onto a lower side of the flats.

According to an embodiment of the invention, a method of aeroponic farming includes the steps of (a) depositing seeds in at least one flat containing micro-fleece cloth; (b) positioning the at least one flat within a growth chamber; (c) subjecting an upper side of the at least one flat to light of the proper frequencies to promote photosynthesis in plants; and (d) spraying a nutrient solution onto the micro-fleece cloth and the developing root mass of the plants.

According to an embodiment of the invention, a cloth flat for seed germination includes a plurality of strips of micro-fleece cloth sewn together to form a plurality of transverse furrows that remain closed when tension is applied orthogonal to the furrows, whereby when un-germinated seeds are positioned within the furrows, the closed furrows protect the un-germinated seeds from direct light.

According to an embodiment of the invention, a structure for seed germination and growth includes first and second sets of rails; wherein each set of rails includes an upper rail and a lower rail; first and second scissors mechanisms; micro-fleece cloth affixed between the first and second scissors mechanisms; the first and second scissors mechanisms being contained within the first and second sets of rails, and, such that as the flat is moved along the first and second sets of rails, a convergence of the upper and lower rails within each set of rails causes a length of the flat to be increased, while a divergence of the first set of rails from the second set of rails causes a width of the flat to be increased.

BRIEF DESCRIPTION OF THE DRAWINGS

FIG. 1 shows a cloth flat according to an embodiment of the invention.

FIG. 2 shows a cross-section of a furrow in the cloth flat of FIG. 1.

FIG. 3 shows a cross-section of a furrow in the cloth flat in FIG. 1 when the cloth flat is pulled taut.

FIG. 4A shows an alternate embodiment of a cloth flat.

FIG. 4B shows a detail of the embodiment of FIG. 4A.

FIG. 6B shows details of an embodiment of FIG. 6A.

FIG. 6C shows details of an alternate arrangement of moving the cloth flats of FIG. 6A.

FIG. 7 shows an expanded view of a spray nozzle used in the embodiment of FIG. 6A.

DETAILED DESCRIPTION OF THE PREFERRED EMBODIMENT

Figure 5:
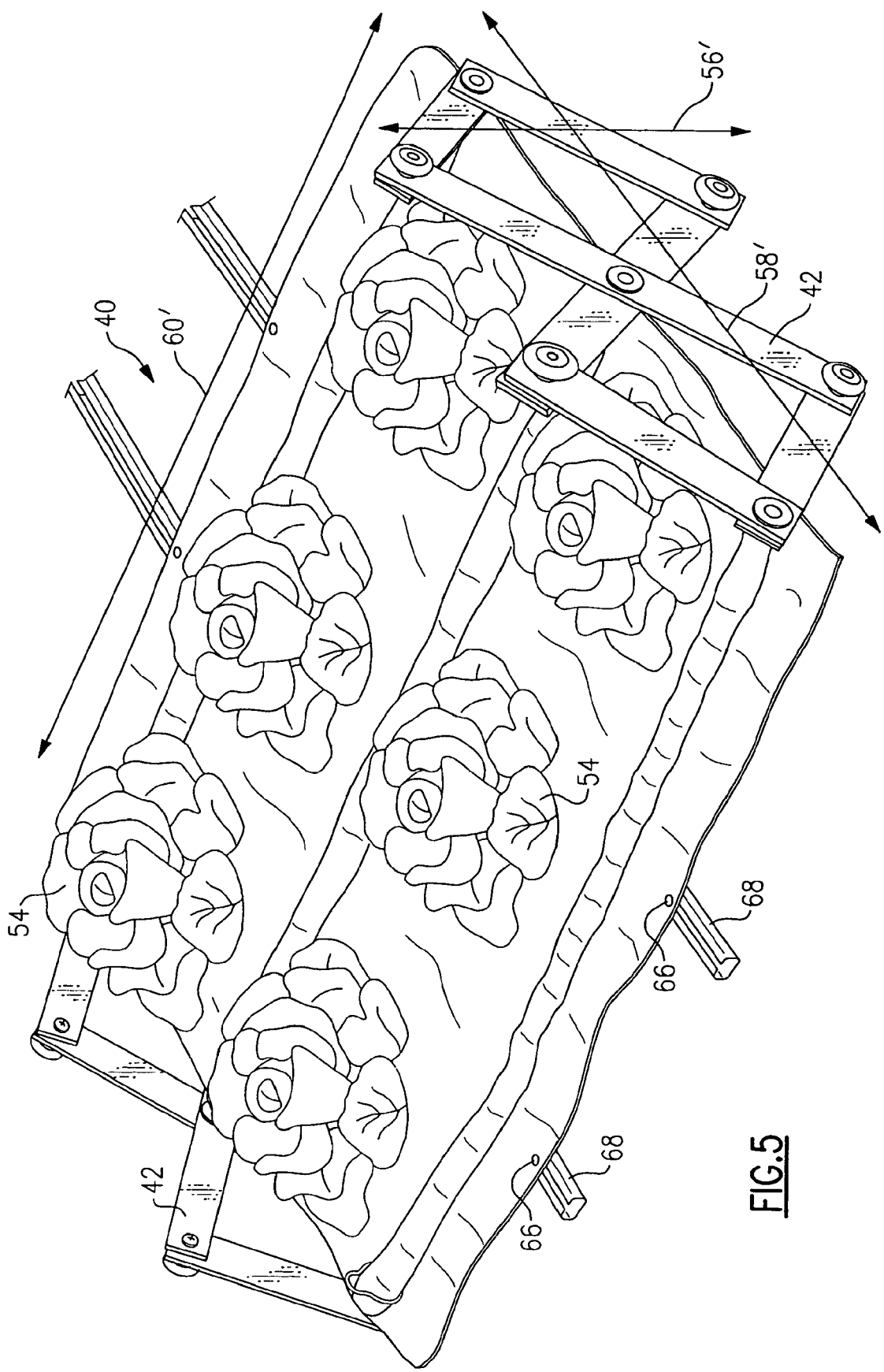
FIG. 5 shows the cloth flat of FIG. 4A stretched in the lengthwise direction.

Areas of controlled environment which are important to the design of a facility to allow successful growing of plants include the following.

Supplying light and maximizing its availability to plants in the right wavelengths. Fluorescent, metal halide, and high-pressure sodium (HPS) are typically used for lighting and may be used to supplement sunlight or as the sole source of light. Metal halides supposedly support vegetative growth better while HPS supposedly support flowering stages better. The different lights have different life and attenuation times, so economic considerations for maintenance and replacement are required. Lights are extremely inefficient leading to excess heat production. Handling this heat production includes both air movement and water-jacketing. As both the lights and the electricity become significant input costs optimizing the space utilization under lights is important. The light (and nutritional) needs of plants during germination, growth, and flowering stages are different. Light needs vary among different species of plants. Many plants require a dark period diurnally for normal growth or a pre-harvest dark period for enhancement of plant characteristics including deleterious compound dissipation, enhanced flavor and color. Typical salad greens can be grown around the clock with little impact other than faster growth, while some evidence exists for a pre-harvest dark period to enhance flavor, reduce nitrates, and improve color.

Optimizing space. Plants are arranged in ways that include vertical or near vertical plant stacking, double cropping, and transplanting from small allocations of space to larger as required by the plant growth. Trapezoidal modules with special features are arranged so that adjacent units run in opposite directions. Modules can be stacked on each other indefinitely, with changes needed only for introducing new plants and harvesting plants that have reached their desired stage of growth.

Providing best environment for roots. Light is not good for roots. Drying out of roots is the greatest danger to healthy plants. Also to be considered is the separation of the root and plant zones. Nutrients that land on plant foliage may alter the taste and appearance of final product. Nutrient excess from top spraying enhances algae growth and aids the spread of disease.

Preventing pests from damaging crops. Typical greenhouse use exposes plants to insects. Screening can be used to help with exclusion, and insect predators are often used as a means of control. Pesticides are to be avoided, but are still common in conventional outdoor or greenhouse production.

Reducing humidity. High humidity indirectly causes tip burn in leafy crops and causes a death of leaves at their perimeter, leading to unsightly foliage, especially post-harvest. The actual cause is believed to be a lack of sufficient calcium at the edges of the growing leaf because of insufficient plant transpiration. By lowering the humidity, transpiration is increased and more calcium becomes available to the cells at the leaf edges. The total light per day also appears to be a contributing factor in causing tip burn, with heat and humidity making tip burn worse. Tip burn is exhibited by a curling and browning (death) of cells at the edges of leaves. Further, plants create a microenvironment in close proximity to the plant with an altered atmosphere impacted by plant functions. This environment must be disturbed to allow access to the enhanced atmosphere, typically lower humidity and increased $CO_2$ concentration.

Maintaining proper temperature. Temperature management is important for both germination and growth and varies among species of plant and during stages of germination and growth. Most leafy greens are cold season crops requiring temperatures below 70 degrees F. and more than 50 degrees F. Methods used to reduce excess heat from the sun or lighting system (lights are inefficient sources of light and losses are in the form of heat) include cooling of (or from) the nutrient solution, shading, direct cooling of light bulbs via air or water (in a jacket) circulation, and mechanical or evaporative cooling of the plant atmosphere. Such methods need to be balanced with economics of energy use and loss of atmospheric enhancements mentioned previously.

Providing labor efficiency. Any vegetable related process is typically labor intensive. Planting of leafy greens is generally automated in some way. Typically, the seeding is done in homogeneous beds to allow for uniformity in the seeding equipment. Labor is used where automated harvesting has not proven satisfactory, such as where field conditions and very small greens make this very difficult. Where the product has a proportion of diseased, malformed, or otherwise undesirable leaves, labor is required to clean the crop. Transplanting, usually for thinning purposes, is labor intensive and poor handling can reduce subsequent crop yields. If crops are dirty from dust in the field or from handling and transportation, either the producer or the consumer must wash the greens prior to consumption. Although washing has been automated, there remains some labor in supporting the process.

Optimizing the atmospheric content and connection. An enhancement to the $CO_2$ content in the growing area can save on both light requirements and increase plant mass. This works against the humidity and temperature controls because both are typically reduced by exhausting the atmosphere of the greenhouse or plant vessel. The plant/atmosphere connection impacts growth as a microclimate is established around each leaf, but disturbing this climate is necessary to allow plants to benefit from increased $CO_2$ and reduced humidity. Too much air movement near plants will reduce growth and above 50 fpm will kill plants.

Optimizing nutrient usage. Nutrients in hydroponic systems are not used up with one application. Most systems allow for the recirculation of nutrient solutions for a finite period, with such a system known as a closed system. Replenishment of nutrients into a recirculating solution is also often practiced, with attention being paid to pH, EC (electrical conductivity), and contaminants (organic compounds from roots and organisms growing in solution). Methods are often used to automate retention of proper solutions.

Referring to FIG. 1, a cloth flat 10 is shown. The use of cloth as a growing medium allows for such cloth to be moved contrary to a cutting tool, thereby providing automated harvesting of plants and roots. This is preferable due to uniformity of surface, ability to be bent over rollers, and lightweight and flexibility of material. Cloth of certain fibers is inert, does not become a biological substrate, and retains attribute and function. It can be cleaned easily and reused for numerous croppings. Organic fibers are to be avoided because they support plant pathogens and other undesirable organisms. Cotton is especially supportive of and possibly contributing foreign organisms to the medium. Non-organic fibers generally hold up under use better than organic fibers, but RAYON® deteriorates after 20 days of use.

The cloth should be unpilled on the upper side, i.e., the side with the seeds and leafy side of the plants. Algae grow better on surfaces with pill than on unpilled surfaces. The weight of the cloth is increased with pill on both sides of the cloth. No advantage is gained from the additional expense of the cloth. The unpilled side does not support germination well, and depending on the looseness of the weave, does not allow root penetration, thereby causing plants to grow above or below the plane of the main cloth, or to push portions of the root above the cloth or the stem below the cloth, leading to less plant productivity and potential harvest losses.

Cloth proved to be a suitable medium but not all fabrics work satisfactorily. Additionally, cloth allowed for space optimization, an important consideration if using an all enclosed space. In many systems, plants must be handled (the reason for thinning in conventional agriculture) when the plants begin to interfere with each other's growth. Cloth as a growing medium is new, unique, and well suited to the purpose of growing plants. It is especially useful for growing vegetables like salad greens by removing any chance for particulates to contaminate the harvest, providing easy handling and automation of cultural practices, and allowing cleaning for growing medium reuse. Further, cloth of the appropriate fiber and weave creates an optimal simulation of proper growing conditions, including access to moisture and support for roots. Further still, cloth provides a barrier to separate root and foliage zones, reducing or removing light from the root zone and removing excess nutrient spray from the foliage zone. Cloth of appropriate weave, fiber, and thickness, and sewn in appropriate configurations can provide a proper germination space, allow plant root growth, provide plant support, and not inhibit unfurling of cotyledons and subsequent leaves.

Soils, aggregates, and inert growth media (rock wool) can all contaminate the final product with particles undesirable to the eater. Fabric that retains its fibers through out the growth of plants will not impart anything to the harvested product. Cloth, by acting like a conveyer belt, lends itself to planting and harvesting. Cloth may be reused numerous times if plants are harvested and roots are removed. Further, this can be automated. Fabrics that allow root penetration and hold water without soaking seeds are able to grow healthy plants. Cloth of the preferred type reduces light to the root zone and absorbs nutrients protecting the spray from reaching plant foliage.

Crops with tuberous roots that might cause plant foliage to be pulled into the root zone may be maintained in place with a mesh attached loosely as an additional layer to the original medium. Plants may be planted in cloth where the fibers loosely hold the seed, protect it from direct light exposure, retain moisture without drowning, and allow initial root hair stability to keep stem and root growing vertically. Experimentation has shown that rolled cloth inserted into slots of cloth with seed planted above the main cloth plane, seams where the pilled side is to the seed and extends above the seed, provide optimal conditions.

In summary, cloth is preferred because of its water absorbing and retention properties, its porosity allowing root growth, its construction preventing spray from directly penetrating the cloth, its handling properties facilitating space optimization, machine washing, seeding, and harvesting, its reusability, its ability to provide plant support, and its non-contamination of the harvested product.

Cloth flat 10 is preferably made of an artificial fiber such as a micro-fleece. The 100 weight POLARTEC® fleece, manufactured by Malden Mills Industries, Inc., 46 Stafford Street, Lawrence, Mass. 1842 under their product style 7365 was used with excellent results. POLARTEC® fleece is unpilled, and the 100 weight fleece is strong without being too heavy. The wicking and water retention properties of the micro-fleece make it ideal for the system of aeroponic farming of the present invention. The 100 weight fleece has a weight of 10.0 oz. per linear yard, 5.1 oz. per square yard, and 172 grams per square meter.

Cloth flat 10 is preferably constructed by cutting strips of fabric in the lengthwise direction along the grain from a roll of fabric. As is standard terminology, "lengthwise" is in the direction of the warp, while "crosswise" is in the direction of the weft. As shown in FIG. 1, a five inch strip 12 is sewn to a four inch strip 14. Strips 12 and 14 are preferably fifty-seven inches long to allow an average person's arm span to reach any spot on flat 10 from the edges. Another consideration in the size of the flat was ensuring that the potential weight of the flat, including the weight of any harvestable plants and nutrients, is sustainable by the material used. Strips 12 and 14 have a natural curl in the crosswise direction. Strips 12 and a plurality of strips 14 are sewn together along seams 18, leaving a plurality of transverse furrows 20 formed from part of each strip. During sewing, the fabric of strips 12 and 14 should not be stretched so as to preserve the natural curl of the fabric. In the embodiment shown, flat 10 includes eleven four-inch strips 14 and one five-inch strip 12. A plurality of snaps 24 are preferably attached to cloth flat 10 near the outer edges. The last strip 14 includes a plurality of hook/loop patches 22b, such as are commonly known as VELCRO® which interconnect with corresponding hook/loop patches 22a on strip 12 of an adjacent flat 10 (not shown).

The flat design is dependent on the desired plant spacing. An alternate embodiment has no furrows. A 12-hour period of covering after seeding will provide sufficient moisture and protection from light to germinate seed. Although seeds aren't harmed by light, they must be moist all of the time but not sit in standing water. Experimentation has shown that closer plant spacing is better, with less algae, more product, and better water retention. In addition, the flats keep their shape better with closer seams. The length of the strips is determined by the machine width minus the trolley and rail width, minus a stretch factor which is determined by routine experimentation, i.e., a SWAG followed by successive refinement.

As shown in FIG. 2, furrow 20 can be flattened open to permit placing a plurality of seeds 36 inside. When sufficient tension is applied to the sides of flat 10 as shown by double-headed arrow 16 (FIG. 1) to furrow 20, furrow 20 closes (as best shown in FIG. 3), thus preventing seeds 36 from falling out of flat 10. During the growing process, the shoots resulting from seeds 36 will poke their leaves above furrow 20 to receive the light necessary for further growth. As the seeds sprout, the hairs of the radicals grip the cloth, while the roots penetrate the cloth. The plants maintain their upright orientation without the need for cutting a hole or slot in the cloth.

An alternative to using furrows is to cover the micro-fleece cloth for 24-48 hours to promote germination, because germination requires elevated moisture levels surrounding the seed. Once the seeds germinate, the cover is carefully removed so as not to disturb the hairs of the radicals which are gripping the micro-fleece cloth.

Referring to FIG. 4A, a flat 40 according to an alternate embodiment of the invention is shown. Flat 40 includes a plurality of dimensional puckers 48 to gather excess fabric. Rings 50, plastic or metal, that release the fabric as it is stretched, hold the fabric in these dimensional puckers 48. Small pieces of cloth are used to germinate the seeds, thereby removing the need for a special germination facility. These small pieces of cloth are termed growth puckers 52 and remain with the plant through harvest. Growth puckers 52 hold the seeds, while dimensional puckers 48 gather up the loose fabric. RAYON® is preferred for the growth puckers 52 because it deteriorates before harvest.

The fabric of flat 40 is attached to a scissors mechanism 42 on each side via rods 62 which fit through sleeves 64 in flat 40. A scissors mechanism 42 includes a plurality of upper wheels 44 and a corresponding plurality of lower wheels 46 which fit into separate upper and lower right and left pairs of rails (shown in part section and in dashed lines). A height 56 (measured from the centers of the corresponding pairs of upper and lower wheels 44, 46) is controlled by the distance between each pair of upper and lower rails. As each upper rail moves closer to its corresponding lower rail, causing height 56 to diminish, a length 58 of flat 40 increases. Thus, length 58 is controlled by controlling the spacing between the upper and lower rails. A width 60 of flat 40 is controlled by the spacing between one pair of upper and lower rails (shown in part section and in dashed lines) and the other pair of upper and lower rails (shown in dashed lines). As shown in FIG. 4B, rods 62 expand and contract as necessary to permit scissors mechanism 42 to stay within the pairs of rails. A plurality of buttons 66 in flat 40 are retained in a plurality of guide tracks 68 to keep the cloth in flat 40 evenly stretched within scissors mechanism 42. Without such buttons, the cloth could easily stretch succeeding dimensional puckers 48 instead of all dimensional puckers 48 equally, thus exceeding the needs of some plants 54 while not meeting the needs of others.

Referring to FIG. 5, as plants 54 in flat 40 grow larger, more space is required on flat 40. Reducing height 56 to a height 56' increases the length 58' of flat 40. Width 60' can be adjusted as described above. Dimensional puckers 48 reduce themselves as the dimensions of flat 40 increase, eventually disappearing. Rings 50 pop off of dimensional puckers 48 and can be recovered for reuse. Dimensional puckers should not be placed below the plane of the fabric, as doing so allows root penetration and subsequent ripping of roots as the material is drawn from the pucker. The placement of the pairs of rails within an aeroponic module is dependent upon the plants being grown, the plants' growth rate, and the plants' eventual size.

Referring to FIGS. 6A-9C, a growth chamber 5 includes at least one aeroponic module 70. Note that module 70 is designed for flats 10 and lacks the dual rails required when using flats 40, but otherwise is similar. Flats 10 are used when the plants are not grown to full size, as for example, when growing baby greens of lettuce, arugula, spinach, etc. A series of modules 70 can be placed end to end to extend the total length of growth chamber 5. Depending on space, modules 70 and series of modules 70 can be stacked on one another, i.e., forming one growth chamber 5 over another growth chamber 5, such as is shown in FIG. 9A as module 104. A roof 102 (FIG. 9A) of each growth chamber 5 is preferably reflective and insulating, for example, made of TEKFOIL® available through Farmtek, 1395 John Fitch Blvd., South Windsor, Conn. 06074, while a floor of each growth chamber 5 is preferably of high molecular weight polyethylene (HMWPE), which is strong, can be welded, and can be shaped to form a trough. The purpose of the growth chamber is to enable management of chamber temperature, humidity, and carbon dioxide; for smaller systems, such management is preferably done within a module 70 or series of modules 70. There is no theoretical limitation on the size of the growth chamber, and in fact, an entire building or warehouse could be used as one large growth chamber.

Figure 6A:
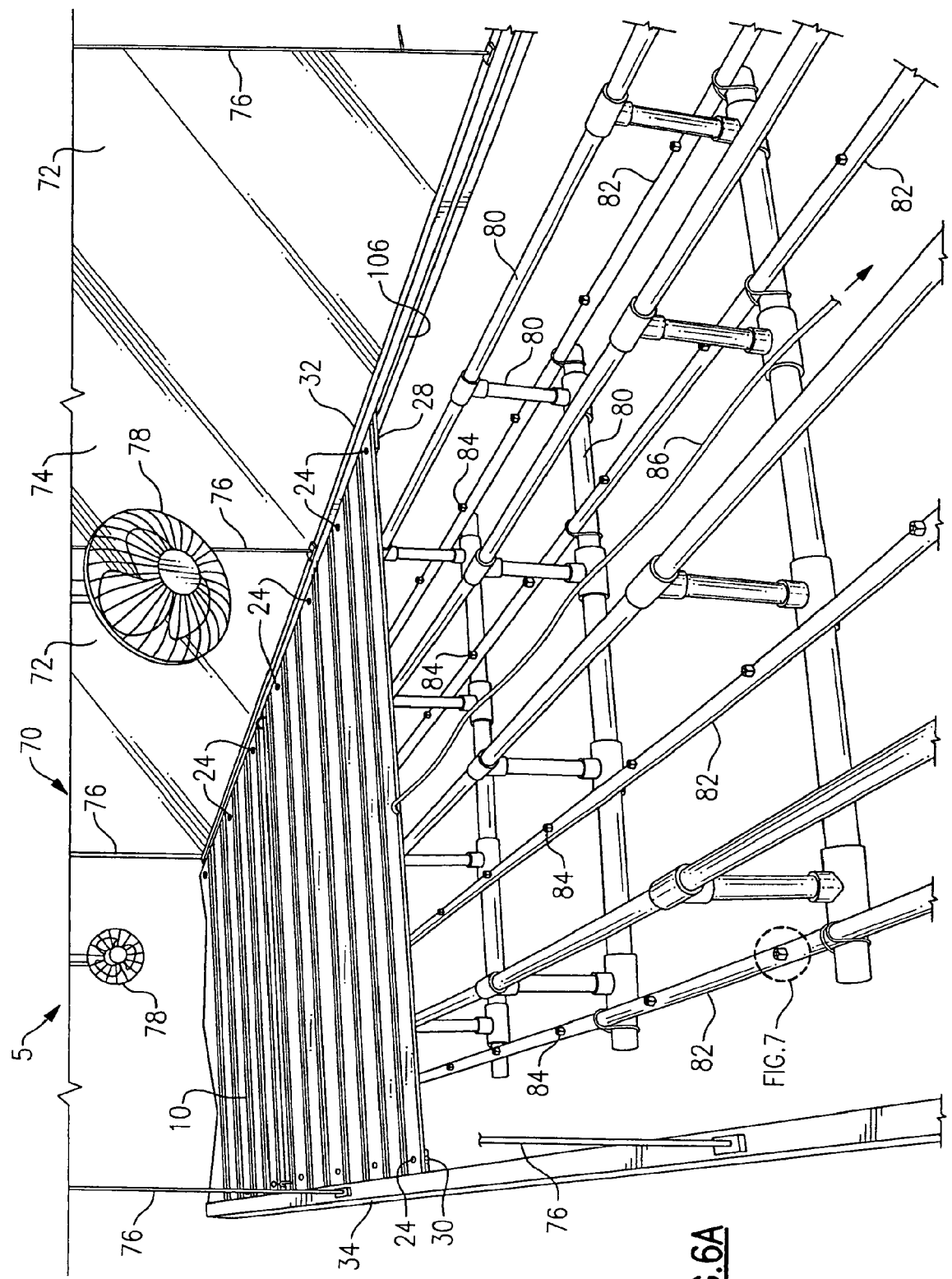
FIG. 6A shows a partially cutaway view of an aeroponic module according to an embodiment of the invention.

As shown in FIG. 6B, flat 10 is fastened via snaps 24 to corresponding snap studs 26 in trolleys 28, 30 which in turn fit inside slots 106 in trolley rails 32, 34 respectively. Snap studs 26 are spaced apart the proper distance to support flat 10. Successive sets of trolleys are preferably connected to each other via a small metal ring 118 or other fastener. Trolleys 28, 30 and trolley rails 32, 34 are of a strong non-rusting material such as plastic or preferably aluminum. Trolleys 28, 30 are preferably interconnected with slots 106 by small wheels 116 which prevent trolleys 28, 30 from falling out of trolley rails 32, 24 as well as permitting flat 10 to be advanced along trolley rails 32, 34 when pulled by a rope 86 (FIG. 6A) or ropes 86' (FIG. 6C). Trolleys 28, 30 could be automated and advanced along trolley rails 32, 34 by a chain within trolley rails 32, 34 or rope 86 could be connected to a motor and gears which would advance flat 10 along trolley rails 32, 34. Such automation, including computerized or mechanical controls for such, is considered to be within the ordinary competence of one skilled in the art, so further description is omitted here.

Referring to FIG. 6C, an embodiment is shown in which snap studs 26 are attached directly to a rope 86', thus obviating the need for trolleys 28, 30. A crank 120 pulls rope 86' across a pulley 122, thus moving flats 10 which are snapped to snaps 26. FIG. 6C shows a right hand rope 86' and pulley 122; a similar setup is on the left hand side of growth chamber 5, preferably with an axle 124 of pulley 122 extending to the left hand side pulley (not shown). Thus, cranking crank 120 moves flats 10 evenly through growth chamber 5. As flats 10 reach the location of pulley 122, an automated cutting apparatus (not shown) could cut the plants, with the cut plants dropping down into a collection chute (not shown), which in turn could lead to a bagging apparatus (not shown) for bagging the produce in a market-ready container.

The speed of advancement would depend on the growth rate of the plants being grown in flats 10 and could be a very slow continuous advancement or a periodic advancement. In practice, as long as the series of modules is not so long that a person cannot advance multiple flats 10 simply by pulling on rope 86 or ropes 86', manual pulling of rope 86 or cranking of ropes 86' using crank 120 is preferred for small systems. Rope 86 can be directly attached to the leading flat 10, to the leading edge of the leading trolleys 28, 30 directly or by a bridle arrangement, or to a wooden or metal dowel which is fastened to the leading edge of trolleys 28, 30.

Referring back to FIG. 6A, trolley rails 32, 34 are supported by the framework composed by a plurality of framing members 76, as are a plurality of side panels 72. Framing members 76 are preferably of a material such as angle iron dimensioned to support side panels 72 and roof panel 102. Side panels 72 and the roof panel are of a suitable material such as preferably TEKFOIL®. An end panel (not shown) is preferably hinged at the top to permit easy access to the end of aeroponic module 70.

A plurality of tubes 80 are preferably connected in a framework to provide support for flats 10 as they become weighted down by moisture or growing plants. Tubes 80 are preferably of PVC, but can be of any rust-proof material that is strong enough to support the weight of flats 10 when they are fully loaded with plants. A plurality of tubes 82, preferably of PVC, are used to transport a nutrient solution from a nutrient tank 92 (FIG. 8) as pumped by a nutrient pumping system 94 to a plurality of spray nozzles 84 which spray a nutrient spray 98 (FIG. 7) onto the bottom of flats 10, where the nutrient solution provides the necessary nutrients to the growing plants. Excess nutrient solution preferably drips down onto a nutrient return tray 90 (FIGS. 8, 9A) which preferably returns the nutrient solution to nutrient tank 92 for re-use. Nutrient return tray 90 is preferably a sheet of plastic, e.g., HMWPE or FRP, connected to horizontal framing members 76 which parallel trolley rails 32, 34. A cross-section of nutrient return tray 90 is preferably arcuate in shape. Although a closed system is preferable and described herein, the present invention can optionally be implemented without re-using the excess nutrient solution.

Spray nozzles 84 preferably provide a wide spray pattern and include a screen, such as the CC-213 providing 3 GPH (100 PSI in a 115 degree spray angle manufactured by KES Industries and available from Ecologic Technologies, P.O. Box 1038, Pasadena, Md. 21123. Nutrient pumping system 94 (FIG. 8) preferably includes a booster pump available from W.W. Grainger, Inc., 100 Grainger Parkway, Lake Forest, Ill., 60045 model #2PC20-1 driven by a variable frequency drive manufactured by Eetron, P.O. Box 4645, Ithaca, N.Y. 14850 connected to a pressure sensor. The pump receives nutrient solution from a large reservoir. Smaller systems can use a diaphragm pump (6 GPM@60 PSI), a pressure tank to relieve the pump of constant running, and a large capacity (25 GPM) filter with a 50 micron pore size insert to remove anything that might clog the nozzle screen. The pump capacity is arrived at by meeting the total capacity of the misting nozzles (nozzles 84), calculating 1 GPH per nozzle times 360 nozzles equals 6 GPM, although some slack is recovered by using the pressure tank Such filters are available as part number 44075K611 from McMaster-Carr of Aurora, Ohio. A timer, also available through Ecologic Technologies, is preferably part of electrical control panel 96 to manage the timing, duration, and interval of the spray.

Side panels 72 are preferably lined with a lining 74 to increase reflectivity of light 100 produced by a plurality of grow lamps 88 preferably inside a duct 112 with a window 114 under each grow lamp 88. In general, a grow lamp is any lamp, light, or series of lights, or mechanism for piping light in from outside the growth chamber, or mechanism for piping sunlight into the growth chamber, as long as the light is effective to promote photosynthesis in plants. Lining 74 is preferably of MYLAR® film manufactured by DuPont. A plurality of fans 78 provide air circulation within module 70, while a separate air movement system for the entire growth chamber 5, irrespective of the number of modules 70, includes an air intake 108, duct 112, an air exhaust 110, and a fan (not shown) for the air movement within duct 112 controlled by an electrical control panel 96.

There are three air circulation needs: (a) turbulence is needed to maintain good contact between the plants and the atmosphere, in the range of from 20 to 50 FPM, (b) a chamber exhaust is needed for removing air that is either too high in temperature or too high in humidity, preferably specified to exhaust the entire volume of growth chamber 5 within about three minutes (as determined by routine experimentation), and (c) excess heat must be removed from grow lamps 88, because grow lamps 88 are only about 30% light efficient. Fans 78 are preferably placed every 10 feet instead of using one large one to keep the FPM low and yet ensure all plants 54 receive a breeze. Air conditioning is optionally used for the influent for the chambers but not for the light duct. The exhaust and light fans are centralized drawing from a plenum filtered by thrips level screen. (Thrips are very small, slender insects that are on the order of 0.05 inch (1.3 mm) to 0.06 inch (1.5 mm) long.)

Figure 8:
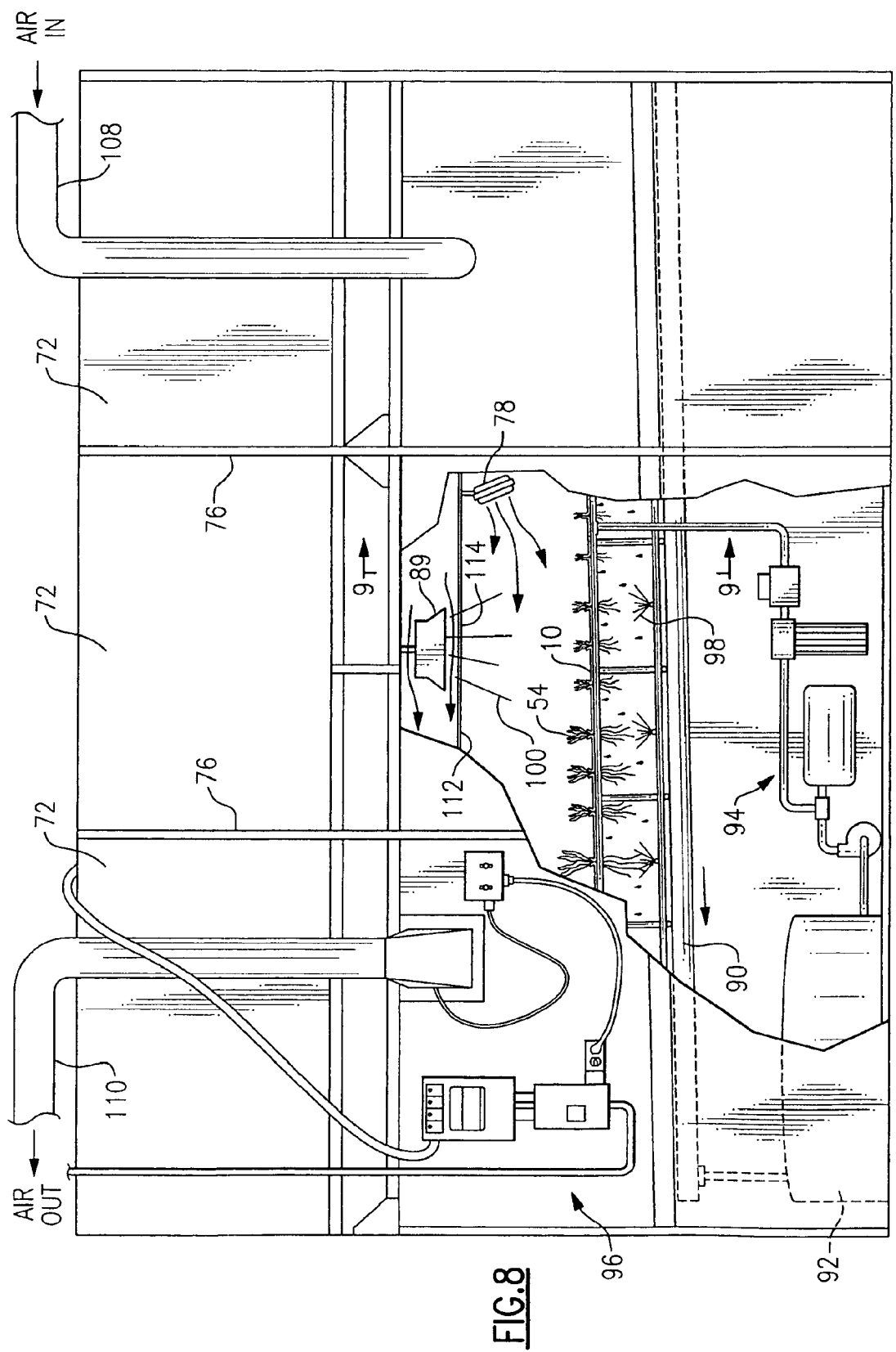
FIG. 8 shows a partially cutaway side elevation view of the aeroponic module of FIG. 6A.
Figure 9A:
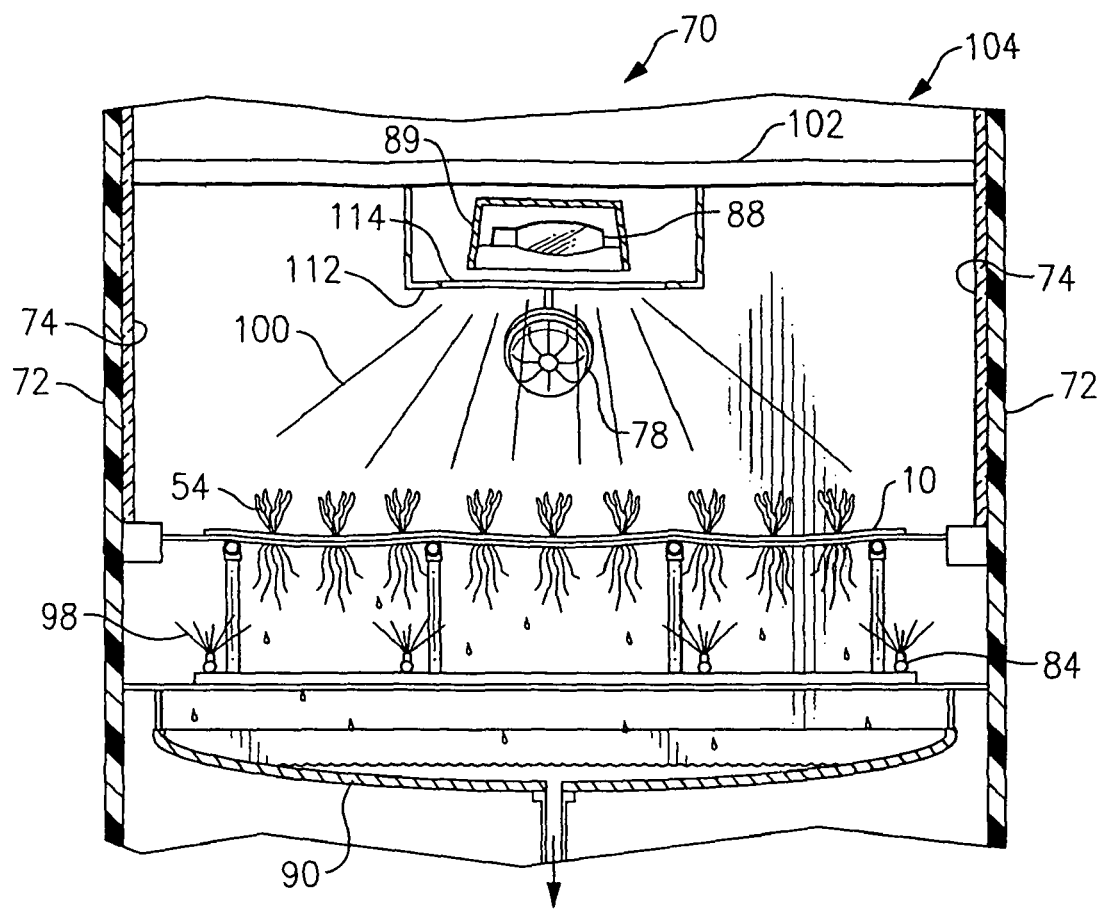
FIG. 9A shows a cross-sectional view of the aeroponic module of FIG. 8.
Figure 9B:
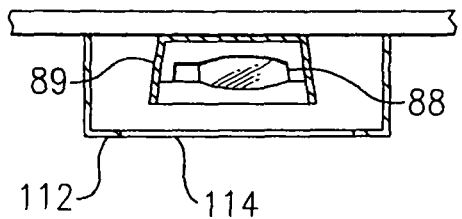
FIG. 9B shows an alternate embodiment of a grow lamp and ventilation duct used in the aeroponic module of FIG. 8.
Figure 9C:
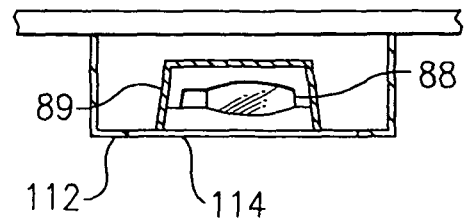
FIG. 9C shows an alternate embodiment of a grow lamp and ventilation duct used in the aeroponic module of FIG. 8.

Referring to FIGS. 8, 9B, and 9C, grow lamps 88 are typically specified based on the area to be covered at a minimum light level. Grow lamps 88 are preferably spaced every five feet. Reflectors 89 are preferable as they both increase light available and manage the pattern. The final configuration of the working module 70 uses a 400-watt HPS ballast and bulb with an EconoGro reflector mounted in duct 112 with tempered glass or other window 114 covering a hole in duct 112 that allows light 100 to shine on flats 10. The lighting systems are available from CropKing, 5050 Greenwich Rd., Seville, Ohio. In FIG. 8, reflector 89 is mounted within duct 112 between the upper and lower sides of duct 112. In FIG. 9B, reflector 89 is mounted to the upper side of duct 112, while in FIG. 9C, reflector 89 is mounted on the lower side of duct 112. These three different mounting locations cause the air flow within duct 112 to move past different parts of the reflector 89 and grow lamp 88 combination. Grow lamps 88 are optionally controlled by a controller (not shown) which controls the intensity, timing, number of lamps, or any combination of these variables. Implementing such a controller is considered to be within the ordinary competence of one skilled in the art, so further description is omitted here. It is preferred to provide even light intensity to the growing plants to equal 15-20 moles/meter/day.

Carbon dioxide is optionally controlled by introducing $CO_2$ from a tank. $CO_2$ is easily delivered to and distributed within the chamber. Plants may deplete the $CO_2$ to levels far below normal ambient (ambient is typically 400 ppm±50 ppm), requiring supplementation. Elevated $CO_2$ has been shown to accelerate plant growth.

Care must be taken not to expose the foliage zone to the root zone either through loss of cloth integrity or around the ends of one or a series of flats 10 not filling module 70. Algae growth becomes markedly enhanced, using up nutrients, creating a thicker layer interfering with clean harvesting, and making the growing area unsightly. Plant leaves often become dusted with dried nutrients, interfering with photosynthesis, potentially altering flavor, and making the product appearance less clean and bright. For this reason, two-inch strip 14 (FIG. 1) of flat 10 is designed to overlap a trailing flat 10 within module 70. The flats must overlap completely to avoid spray to the top of the flats and light to the bottom, which causes increased algae growth. For the same reason, stretch should not cause large gaps between the edge of the flats and the trolley between the snaps.

Various system considerations follow. The nutrient solution is sprayed from underneath flats 10. Irrigation is preferably in ten foot zones, matching the size of the individual modules. The size of the individual modules is mostly a function of the readily available lengths of the materials used, such as PVC, RFP, aluminum, angle iron, etc. Lengthening the interval of nutrient spraying creates root damage, while increasing the intensity of the spray removes root hairs. Loss of electricity creates plant death in less than three hours depending on relative humidity, temperature, and size of plant. Placing lights in a duct with tempered air circulation both cools the lamps and removes heat from plant areas. Heat may be recovered for other purposes. The duct may be placed above plants in such manner as to control and alter the distance from plant to lamp as required by stage of growth. Using a tight enclosure with filtered air reduces the risk of insect infestation. Moving the plants, while growing, through the chamber averages the impact of placement relative to the light pattern, asynchronous changes in the light intensity of different lights as they age, nutrient spray pattern, local atmosphere, or cloth moisture, thereby ensuring a uniform crop. Lights present a varying pattern of light quantity and quality impacted by bulb orientation and construction, reflector, and any lens (thickness, color, and material) placed between the plants and light. Plants are impacted by reflectance and absorbance of materials of the walls or suspended in the growth chamber. Nutrients provided via nozzles which create fine mists may direct droplets in varying degrees to any one place in the spray pattern. The local atmosphere may vary because of fan placement and proximity to chamber walls. Cloth will puddle the nutrient solution slightly if it dimples due to insufficient tension or anomalies in the cloth and/or flat fabrication. Seeds placed in such puddled areas germinate and grow differently, some better and some worse than others.

The technology provides the following advantages. The use of cloth, fabrication of flats made of cloth, and the method of spacing plants are novel. Optimization and automation of plant spacing avoids labor and the trauma to plants. It also removes wasted space, including related costs of light, nutrients, and other inputs, that some other types of hydroponics must employ. The mobility of cloth flats also lends itself to a variety of labor saving designs for planting, harvest, and packaging. The use of cloth for a growth medium is potentially less expensive than rock wool. The green aspects of the technology include minimal use of water per plant due to spacing and enclosure, little effluent created as solutions are recycled, reuse of the cloth growth medium, and maximum energy efficiency. Further improvements could be gained from alternative power sources, use of excess heat, and generation of compost or animal feed from any discarded plant material. Lamp heat is removed and is available for use beneficially to heat external space, and the light intensity to the plants is controlled. Plant growth is supported. Space is optimized relative to the plant stage. The root and foliage zones of growing plants are separated. Plants are protected from insect infestation. Crop uniformity is improved. The invention lends itself to automate harvests. The plant growth medium is reusable.

The growth chambers can be built with one unit or with more than ten units, since each chamber is self-contained with low external impact. This flexibility in construction of the growth chambers allows conventional warehouse space to be used. The use of multiple chambers allows tailoring of each chamber to the specific needs of the plants being grown including light, temperature, nutrient composition, delivery, and space. There is little waste of the CO2 used in atmospheric enrichment. Light usage is maximized. Redundancy through multiple chambers in a facility reduces the risks of crop failures, especially when compared to conventional farming or greenhouse farming.

Table 1 compares the characteristics of conventional field grown production with production from the present invention.

TABLE 1

| Characteristics | Conventional | Present Invention |
| --- | --- | --- |
| When available | Only during summer | Grow every day |
| Growth efficiency | Harvest on day 35-70 | Harvest before day 20-25 |
| Space efficiency | Rows 24" apart | Plant dependent space |
| Energy efficiency | From 10 to 30 trips across field; trucking; washing | Only optimized electrical applications |
| Safety | Pesticides | No pesticides |
| Labor efficiency | Hours of menial labor | Minutes of labor |
| Capital efficiency | Variable yield and cost | Predictable yield and cost |
| Water efficiency | Typically irrigated | Recycled nutrient solution |
| Distribution efficiency | from 1-10 days trucking | Fresh locally today |
| Shelf life at destination | 1-4 days | 10-21 days |

In operation, flat 10 is wetted with nutrient solution, after which the seeds are added. When using flats with furrows, furrows 20 are flattened out. Seeds 36 are placed in each furrow 20 a suitable distance apart. Tension is applied to flat 10 to close the furrows 20. Flat 10 is snapped to trolleys 28, 30 before being carried to module 70, which enhances keeping flat 10 under tension. Flat 10 is then carried and placed inside aeroponic module 70, where flat 10 is snapped to trolleys 28, 30. Flat 10 is now within the growth chamber. Alternately, flat 10 is placed within the growth chamber before seeds 36 are "planted" within furrows 20. A number of "planted" flats 10 can be placed within module 70, depending on the number of plants and days of growth desired. As germination proceeds, additional flats 10 can be prepared with seeds and placed inside the growth chamber. The leading flat 10 is moved as described earlier, and the connection of chains of trolleys 28, 30 moves all flats 10 into the growth chamber. The flats 10 are moved within growth chamber 5 such that when the leading flat 10 reaches the end of the growth chamber, plants 54 are ready for harvesting. The length of the growing operation depends on whether baby greens or full plants are being grown.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A structure for seed germination and growth, comprising:
    first and second sets of rails; wherein each set of rails includes an upper rail and a lower rail;
    first and second scissors mechanisms;
    cloth affixed between the first and second scissors mechanisms to form a flat;
    the first and second scissors mechanisms being contained within the first and second sets of rails, and, such that as the flat is moved along the first and second sets of rails, a convergence of the upper and lower rails within each set of rails causes a length of the flat to be increased, while a divergence of the first set of rails from the second set of rails causes a width of the flat to be increased.

2. A structure according to claim 1, further comprising means for retaining an even dispersion of a plurality of seeded plants as the plurality of seeded plants grow in the cloth as the cloth is moved along the first and second sets of rails.

3. A structure according to claim 1, wherein the cloth flat comprises a plurality of strips of cloth sewn together to form a plurality of transverse furrows that remain closed when tension is applied orthogonal to the furrows, wherein when un-germinated seeds are positioned in the furrows, the closed furrows protect the un-germinated seeds from light and retain moisture in close proximity to the un-germinated seeds.

4. A structure according to claim 1 wherein the cloth comprise a polyester material.

5. A structure according to claim 1 wherein the cloth is reusable.

* * * * *